(12) United States Patent
Kang

(10) Patent No.: US 12,451,029 B2
(45) Date of Patent: Oct. 21, 2025

(54) TEST DUMMY AND METHOD OF VERIFYING A PASSENGER DETECTION SYSTEM USING THE SAME

(71) Applicants: HYUNDAI MOTOR COMPANY, Seoul (KR); KIA CORPORATION, Seoul (KR)

(72) Inventor: Seung Kyu Kang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 355 days.

(21) Appl. No.: 18/079,571

(22) Filed: Dec. 12, 2022

(65) Prior Publication Data

US 2024/0054916 A1  Feb. 15, 2024

(30) Foreign Application Priority Data

Aug. 9, 2022  (KR) ........................ 10-2022-0099322

(51) Int. Cl.
G09B 23/30 (2006.01)
B60N 2/00 (2006.01)
B60R 21/015 (2006.01)

(52) U.S. Cl.
CPC ......... G09B 23/303 (2013.01); B60N 2/0022 (2023.08); B60R 21/01534 (2014.10); B60N 2/002 (2013.01)

(58) Field of Classification Search
CPC ........................... G09B 23/303; B60N 2/0022
See application file for complete search history.

(56) References Cited

U.S. PATENT DOCUMENTS

| | | | |
|---|---|---|---|
| 6,749,433 B2 | 6/2004 | Kassai et al. | |
| 2006/0180764 A1* | 8/2006 | Yajima | B60R 21/01534 701/45 |
| 2007/0131043 A1* | 6/2007 | Frost | G09B 23/32 73/866.4 |

FOREIGN PATENT DOCUMENTS

| | | | |
|---|---|---|---|
| CN | 207556872 U | * | 6/2018 |
| JP | 2021163401 A | | 10/2021 |
| KR | 101431102 B1 | | 8/2014 |
| KR | 101686460 B1 | | 12/2016 |
| KR | 20180090665 A | | 8/2018 |
| KR | 20200132564 A | | 11/2020 |

* cited by examiner

Primary Examiner — Herbert K Roberts
(74) Attorney, Agent, or Firm — Lempia Summerfield Katz LLC

(57) ABSTRACT

Disclosed is a test dummy including: a dummy body, a reservoir fixed to the dummy body and having an internal space for storing a fluid, a tube unit having a flow path through which the fluid stored in the reservoir circulates, and a heating unit configured to heat the fluid.

12 Claims, 3 Drawing Sheets

TEST DUMMY AND METHOD OF VERIFYING A PASSENGER DETECTION SYSTEM USING THE SAME

CROSS-REFERENCE TO RELATED APPLICATION

This application claims priority to and the benefit of Korean Patent Application No. 10-2022-0099322, filed in the Korean Intellectual Property Office on Aug. 9, 2022, the entire contents of which are incorporated herein by reference.

TECHNICAL FIELD

The present disclosure relates to a test dummy and a method of verifying a passenger detection system using the same, and more particularly, to a test dummy capable of imitating a child seated in a vehicle, and a method of verifying a passenger detection system using the same.

BACKGROUND ART

The statements in this section merely provide background information related to the present disclosure and may not constitute prior art.

As accidents caused by leaving children unattended in vehicles have emerged as social problems, development is being actively conducted on a system capable of detecting the presence or absence of a child seated in the vehicle. In the related art, for example, the system capable of detecting the presence or absence of the child seated in the vehicle uses a method of identifying the presence or absence of the child by detecting a motion of the child. The child detection system for a vehicle in the related art generally has an ultrasonic detection sensor or a radar sensor to detect the motion of the child.

Meanwhile, an evaluation system for verifying the child detection system is required to identify whether the child detection system properly operates. In this case, because the child detection system for a vehicle in the related art detects the motion of the child as described above, the method of evaluating the child detection system in the related art is also performed by identifying whether the child detection system for a vehicle correctly detects a motion of a dummy, which imitates the child, when the dummy performs the motion.

Meanwhile, another method of detecting the presence or absence of the child identifies the presence or absence of the child by detecting body heat radiated from the child without detecting the motion of the child. However, in the related art, there is no system for evaluating the child detection system for a vehicle that detects the presence or absence of the child by detecting the body heat of the child.

SUMMARY

The present disclosure has been made in an effort to provide a test dummy and system capable of effectively evaluating a child detection system that identifies the presence or absence of a child by detecting body heat of the child.

An embodiment of the present disclosure provides a test dummy including: a dummy body; a reservoir fixed to the dummy body and having an internal space for storing a fluid; a tube unit having a flow path through which the fluid stored in the reservoir circulates; and a heating unit configured to heat the fluid.

In one embodiment, the tube unit may include: a fluid supply region having one side connected to the reservoir and the other side connected to the heating unit; a fluid circulation region having one side connected to one region of the heating unit and the other side connected to the other region of the heating unit; and a fluid return region having one side connected to the reservoir and the other side connected to the heating unit, and the fluid supply region and the fluid circulation region may communicate with each other through the heating unit.

In one embodiment, the fluid return region and the fluid circulation region may communicate with each other through the heating unit.

In another embodiment, the test dummy may further include a pump configured to provide power for moving the fluid circulating through the tube unit.

In one embodiment, the pump may be provided in an upstream region of the fluid circulation region based on a route through which the fluid flows.

In one embodiment, the dummy body may include: a dummy body region defined by imitating a body shape of a child; a dummy head region connected to one side of the dummy body region and defined by imitating a head shape of the child; dummy arm regions connected to one side of the dummy body region and defined by imitating arm shapes of the child; and dummy leg regions connected to one side of the dummy body region and defined by imitating leg shapes of the child.

In one embodiment, the reservoir may be fixed to the dummy body region.

The fluid circulation region may be provided to pass through the dummy head region, the dummy arm region, and the dummy leg region.

In one embodiment, the dummy arm regions may include: a first dummy arm region defined by imitating one of right and left arms of the child; and a second dummy arm region defined by imitating the other of the right and left arms of the child. The dummy leg regions may include: a first dummy leg region defined by imitating one of right and left legs of the child; and a second dummy leg region defined by imitating the other of the right and left legs of the child. In one embodiment, the fluid circulation region may be provided to extend from the heating unit and sequentially pass through the first dummy leg region, the first dummy arm region, and the dummy head region.

In one embodiment, the fluid circulation region may be provided to extend from a portion passing through the dummy head region, pass through the second dummy arm region and the second dummy leg region, and return to the heating unit.

In one embodiment, the test dummy may further include a control unit fixed to one side of the dummy body. The reservoir may further include a sensor member configured to measure a temperature of the fluid stored in the internal space, and the control unit includes: a display region configured to visually display information on a temperature measured by the sensor member; and an input region configured to set a target temperature of the fluid stored in the internal space of the reservoir.

Another embodiment of the present disclosure provides a method of verifying a passenger detection system. In particular, the method includes: a dummy arrangement step of arranging a test dummy, which is defined by imitating a person, in a seat of a vehicle; a fluid circulation step of heating a fluid in the test dummy and circulating the fluid in the test dummy; and an infrared ray detection step of detecting infrared rays radiated from the test dummy.

The dummy arrangement step may include arranging the test dummy in a rear seat of the vehicle.

The test dummy may have a shape that imitates a child.

According to the present disclosure, it is possible to provide the test dummy and system capable of effectively evaluating the child detection system that identifies the presence or absence of the child by detecting body heat of the child.

BRIEF DESCRIPTION OF THE DRAWINGS

In order that the disclosure may be well understood, there are now described various forms thereof, given by way of example, reference being made to the accompanying drawings, in which.

The drawings described herein are for illustration purposes only and are not intended to limit the scope of the present disclosure in any way.

DETAILED DESCRIPTION

Hereinafter, a test dummy according to an embodiment of the present disclosure is described with reference to the drawings.

Figure 1:
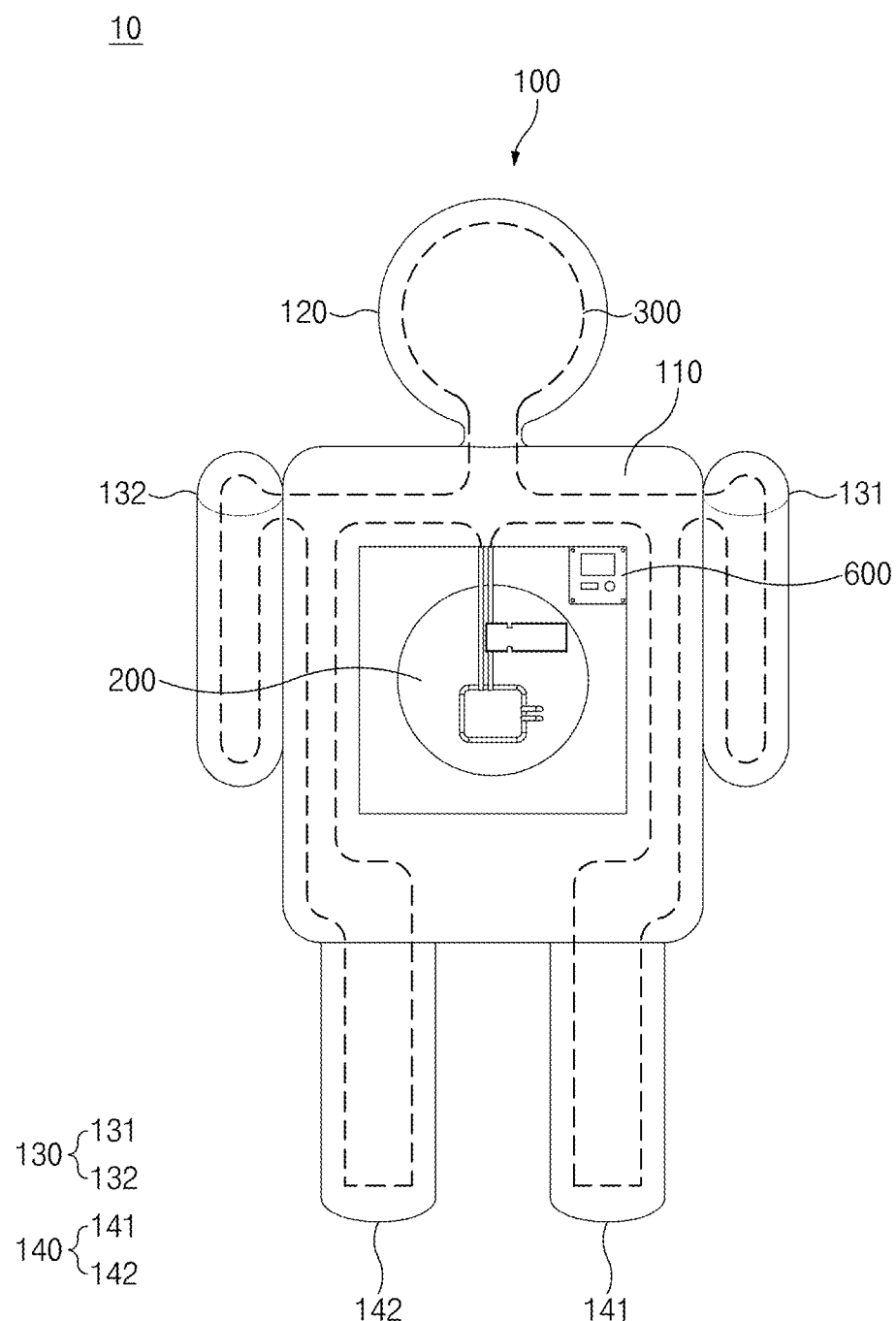
FIG. 1 is a view illustrating a test dummy according to one embodiment of the present disclosure.
Figure 2:
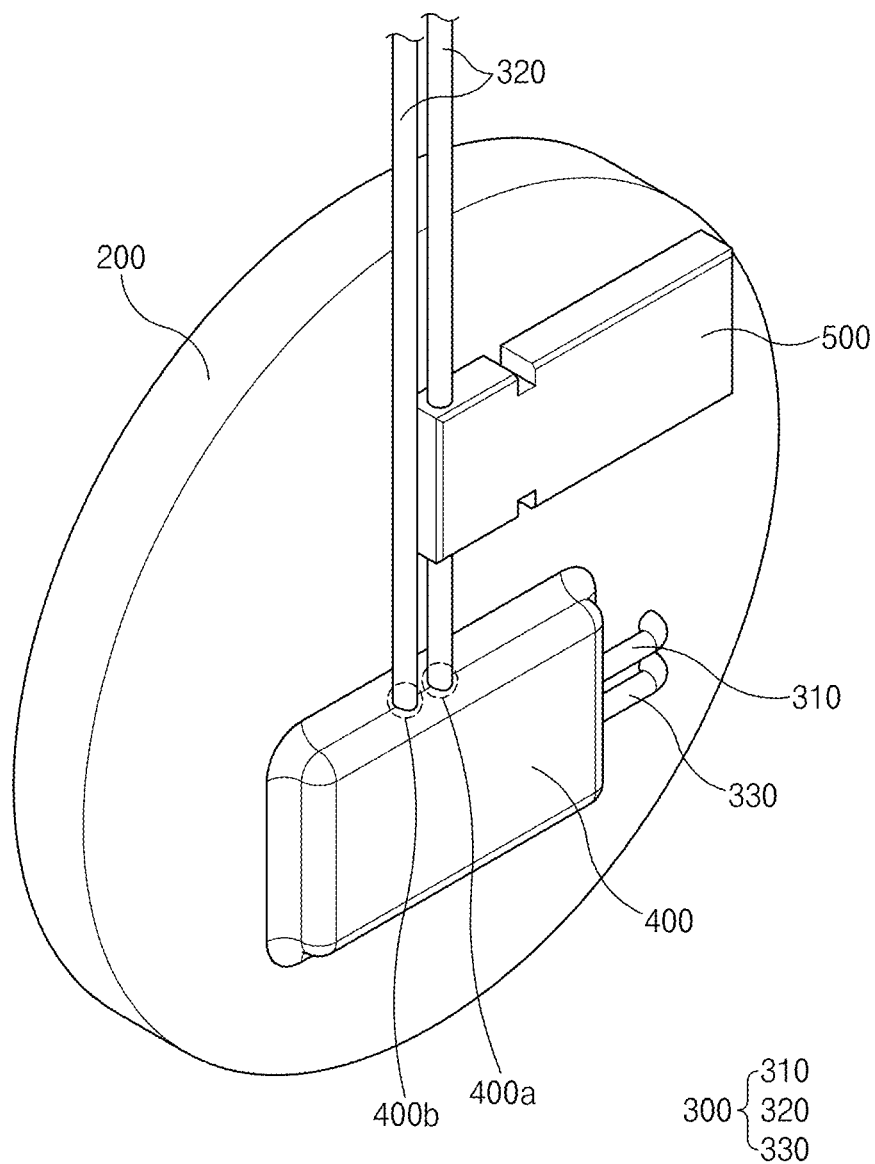
FIG. 2 is an enlarged view of a reservoir, a tube unit, a heating unit, and a pump provided in a test dummy according to one embodiment of the present disclosure.
Figure 3:
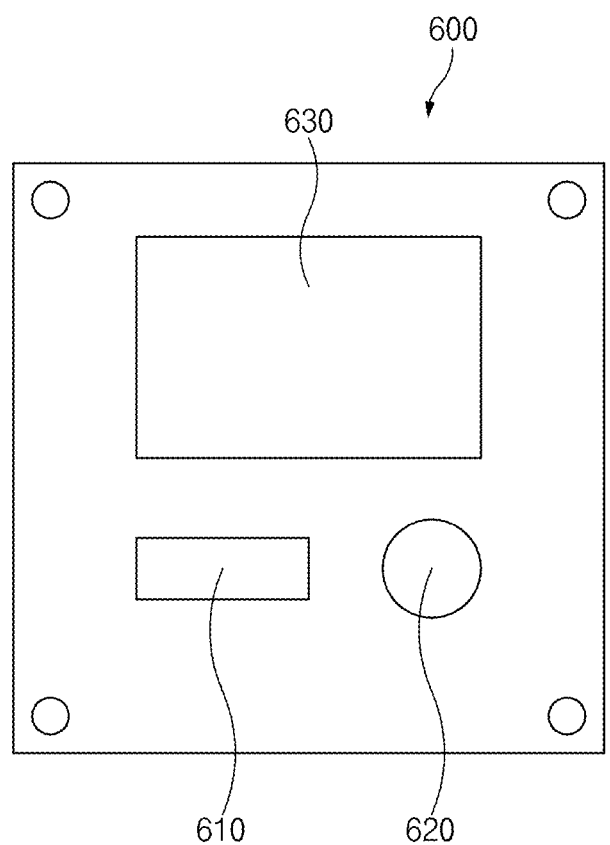
FIG. 3 is an enlarged view of a control unit provided in the test dummy according to the present disclosure.

FIG. 1 is a view illustrating a test dummy according to the present disclosure, and FIG. 2 is an enlarged view of a reservoir, a tube unit, a heating unit, and a pump provided in a test dummy according to the present disclosure. FIG. 3 is an enlarged view of a control unit provided in the test dummy according to the present disclosure.

Test Dummy

A test dummy 10 according to an embodiment of the present disclosure may be used to verify a system disposed in a vehicle and configured to detect the presence or absence of a passenger seated in the vehicle. For example, the test dummy 10 may be used to verify the system disposed in the vehicle and configured to detect the presence or absence of the child seated in the vehicle in order to prevent an accident caused by leaving the child unattended and seated in a rear seat of the vehicle. More specifically, the test dummy 10 may be used to verify a system disposed in the vehicle and configured to detect the presence or absence of a passenger seated in the vehicle by detecting infrared rays radiated from a person or child.

As illustrated in FIG. 1, the test dummy 10 may include a dummy body 100 that defines a body of the test dummy. The dummy body 100 may be configured to imitate a shape of a person and have a shape corresponding to the person. More specifically, the dummy body 100 may have a shape corresponding to a child.

The test dummy 10 may further include a reservoir 200 fixed to one side of the dummy body 100 and having an internal space for storing a fluid.

As described above, the test dummy 10 may be used to verify the system disposed in the vehicle and configured to detect the presence or absence of a passenger seated in the vehicle by detecting infrared rays radiated from a person or child seated in the vehicle. Therefore, the test dummy 10 needs to have a means for imitating the infrared rays radiated from the person or child. To this end, the test dummy 10 according to the present disclosure may imitate infrared rays radiated from the person or child by circulating a fluid heated to a temperature similar to a body temperature of the person. In this case, the reservoir 200 may have the internal space for storing the fluid.

Referring to FIGS. 1 and 2, the test dummy 10 may further include a tube unit 300 having a flow path through which the fluid stored in the reservoir 200 circulates. The tube unit 300 may have a tubular shape as a whole. The flow path for the fluid, which is defined by the tube unit 300, may have a shape of a closed loop through which the fluid may repeatedly circulate.

In addition, the test dummy 10 may further include a heating unit 400 configured to heat the fluid. The heating unit 400 may be configured to heat the fluid before the fluid is discharged from the reservoir 200 and circulates so that the fluid has a temperature similar to the body temperature of the person or child. For example, the heating unit 400 may include an electrical resistance member configured to convert electrical energy into thermal energy, and the fluid may pass through the electrical resistance member. However, the heating unit 400 may heat the fluid in various ways.

Meanwhile, the tube unit 300 may be divided into a plurality of regions. More specifically, as illustrated in FIG. 1, the tube unit 300 may include: a fluid supply region 310 having one side connected to the reservoir 200 and the other side connected to the heating unit 400; a fluid circulation region 320 having one side connected to one region 400a of the heating unit 400 and the other side connected to the other region 400b of the heating unit 400; and a fluid return region 330 having one side connected to the reservoir 200 and the other side connected to the heating unit 400.

According to one embodiment of the present disclosure, the fluid stored in the reservoir 200 may be supplied to the heating unit 400 through the fluid supply region 310. The fluid heated by the heating unit 400 may be discharged from the heating unit 400 and then pass through the dummy body 100 while flowing through the fluid circulation region 320. The fluid, which has passed through the dummy body 100, may sequentially pass through the heating unit 400 and the fluid return region 330 and then enter the reservoir 200 again. To implement the above-mentioned flow of the fluid, the fluid supply region 310 and the fluid circulation region 320 may communicate with each other through the heating unit 400, and the fluid return region 330 and the fluid circulation region 320 may communicate with each other through the heating unit 400.

In one embodiment, the test dummy 10 may further include a pump 500 configured to provide power for moving the fluid that circulates through the tube unit 300. The pump 500 may be configured to pump the fluid that flows through the flow path in the tube unit 300. For example, the pump 500 may be configured to pump the fluid immediately after the fluid is discharged from the heating unit 400. In one form, the pump 500 may be provided in an upstream region of the fluid circulation region 320 based on a route through which the fluid flows, as illustrated in FIG. 2. This can be understood as the configuration that the pump 500 is coupled to the fluid circulation region 320 and disposed adjacent to the heating unit 400.

Referring to FIG. 1, the dummy body 100 may include: a dummy body region 110 defined by imitating a body shape of a person or child; a dummy head region 120 connected to one side of the dummy body region 110 and defined by imitating a head shape of the person or child; dummy arm regions 130 connected to one side of the dummy body region 110 and defined by imitating arm shapes of the person or child; and dummy leg regions 140 connected to one side of the dummy body region 110 and defined by imitating leg shapes of the person or child.

In this case, the reservoir 200 may be fixed to the dummy body region 110. In addition, the fluid circulation region 320 may pass through the dummy head region 120, the dummy arm region 130, and the dummy leg region 140. In this case, the fluid flowing through the flow path of the tube unit 300 may flow through all the dummy body region 110, the dummy head region 120, the dummy arm regions 130, and the dummy leg regions 140, which makes it possible to uniformly increase an overall temperature of the dummy body 100.

More particularly, the dummy arm regions 130 may include: a first dummy arm region 131 defined by imitating one of right and left arms of a person or child; and a second dummy arm region 132 defined by imitating the other of the right and left arms of the person or child. The dummy leg regions 140 may include: a first dummy leg region 141 defined by imitating one of right and left legs of the person or child; and a second dummy leg region 142 defined by imitating the other of the right and left legs of the person or child. In this case, the fluid circulation region 320 may be provided to extend from one region 400a of the heating unit 400 and sequentially pass through the first dummy leg region 141, the first dummy arm region 131, and the dummy head region 120. The fluid circulation region 320 may be provided to extend from a portion passing through the dummy head region 120, pass through the second dummy arm region 132 and the second dummy leg region 142, and then return to the other region 400b of the heating unit 400.

In one embodiment, as illustrated in FIGS. 1 and 3, the test dummy 10 may further include a control unit 600 fixed to one side of the dummy body 100.

In this embodiment, the reservoir 200 of the test dummy 10 may further include a sensor member (not illustrated) configured to measure a temperature of the fluid stored in the internal space. The control unit 600 may include a display region 610 configured to visually display information on a temperature measured by the sensor member; and an input region 620 configured to allow an operator to set a target temperature of the fluid stored in the internal space of the reservoir 200. Therefore, the operator may visually identify, through the display region 610, the temperature of the fluid circulating through the test dummy 10 and adjust, through the input region 620, the temperature of the fluid based on information on the temperature displayed in the display region 610.

Meanwhile, the control unit 600 may adjust the temperature of the fluid by controlling an operation of the heating unit 400. For example, when the operator does not manipulate the control unit 600 through the input region 620, the control unit 600 may control an output of the heating unit 400 so that the temperature of the fluid is kept similar to the body temperature. In contrast, when the operator increases the target temperature of the fluid through the input region 620, the control unit 600 may control the heating unit 400 to increase the output of the heating unit 400.

Referring to FIG. 3, the control unit 600 may further include a power source region 630 configured to control whether to operate the heating unit 400 and the pump 500. More specifically, when the operator pushes the power source region 630, the control unit 600 may perform control to operate the heating unit 400 and the pump 500 or end the operations of the heating unit 400 and the pump 500.

Method of Verifying Passenger Detection System

Hereinafter, a method of verifying a passenger detection system according to another embodiment of the present disclosure is described with reference to the above-mentioned description and the drawings.

A passenger detection system according to the present disclosure may be used to verify a system disposed in the vehicle and configured to detect the presence or absence of a person or child seated in the vehicle. More specifically, the passenger detection system according to the present disclosure may be used to verify a system disposed in the vehicle and configured to detect the presence or absence of a passenger seated in the vehicle by detecting infrared rays radiated from a person or child.

More specifically, the method of verifying the passenger detection system according to one embodiment of the present disclosure may include: a dummy arrangement step of arranging the test dummy 10, which is defined by imitating a person, in a seat of the vehicle; a fluid circulation step of heating the fluid in the test dummy 10 and circulating the fluid in the test dummy 10; and an infrared ray detection step of detecting infrared rays radiated from the test dummy 10. Meanwhile, the infrared ray detection step may be performed together with the fluid circulation step. The infrared ray detection step may be performed after the fluid circulation step is ended.

More particularly, in the dummy arrangement step, the test dummy 10 may be disposed in the rear seat of the vehicle. The test dummy 10 may have a shape that imitates a child.

Meanwhile, the above-mentioned description of the test dummy according to the present disclosure may also be equally applied to a test dummy used for the method of verifying a passenger detection system according to the present disclosure.

The present disclosure has been described with reference to the limited embodiments and the drawings, but the present disclosure is not limited thereby. The present disclosure may be carried out in various forms by those having ordinary skill in the art, to which the present disclosure pertains, within the technical spirit of the present disclosure and the scope equivalent to the appended claims.

DESCRIPTION OF REFERENCE NUMERALS

10: Test dummy
100: Dummy body
110: Dummy body region
120: Dummy head region
130: Dummy arm region
131: First dummy arm region
132: Second dummy arm region
140: Dummy leg region
141: First dummy leg region
142: Second dummy leg region
200: Reservoir
300: Tube unit
310: Fluid supply region
320: Fluid circulation region
330: Fluid return region
400: Heating unit
500: Pump
600: Control unit
610: Display region
620: Input region
630: Power source region

What is claimed is:

1. A test dummy comprising:
   a dummy body;
   a reservoir fixed to the dummy body and having an internal space for storing a fluid;
   a tube unit having a flow path through which the fluid stored in the reservoir circulates; and
   a heating unit configured to heat the fluid,
   wherein the dummy body comprises:
      a dummy body region defined by imitating a body shape of a human;
      a dummy head region connected to one side of the dummy body region and defined by imitating a head shape of the human;
      dummy arm regions connected to one side of the dummy body region and defined by imitating arm shapes of the human; and
      dummy leg regions connected to one side of the dummy body region and defined by imitating leg shapes of the human, and
   wherein a fluid circulation region of the tube unit passes through the dummy head region, the dummy arm regions, and the dummy leg regions.

2. The test dummy of claim 1, wherein the tube unit comprises:
   a fluid supply region having a first side connected to the reservoir and a second side connected to the heating unit;
   the fluid circulation region having a first side connected to a first region of the heating unit and a second side connected to a second region of the heating unit; and
   a fluid return region having a first side connected to the reservoir and a second side connected to the heating unit, and
   wherein the fluid supply region and the fluid circulation region communicate with each other through the heating unit.

3. The test dummy of claim 2, wherein the fluid return region and the fluid circulation region communicate with each other through the heating unit.

4. The test dummy of claim 1, further comprising:
   a pump configured to provide power for moving the fluid circulating through the tube unit.

5. The test dummy of claim 4, wherein the pump is provided in an upstream region of the fluid circulation region based on a route through which the fluid flows.

6. The test dummy of claim 1, wherein the reservoir is fixed to the dummy body region.

7. The test dummy of claim 2, wherein the dummy arm regions comprise:
   a first dummy arm region defined by imitating one of right and left arms of the human; and
   a second dummy arm region defined by imitating the other of the right and left arms of the human,
   wherein the dummy leg regions comprise:
   a first dummy leg region defined by imitating one of right and left legs of the human; and
   a second dummy leg region defined by imitating the other of the right and left legs of the human, and
   wherein the fluid circulation region is provided to extend from the heating unit and sequentially pass through the first dummy leg region, the first dummy arm region, and the dummy head region.

8. The test dummy of claim 7, wherein the fluid circulation region is provided to extend from a portion passing through the dummy head region, pass through the second dummy arm region and the second dummy leg region, and return to the heating unit.

9. The test dummy of claim 1, further comprising:
   a control unit fixed to one side of the dummy body,
   wherein the reservoir further comprises a sensor member configured to measure a temperature of the fluid stored in the internal space, and
   wherein the control unit comprises:
   a display region configured to visually display information on a temperature measured by the sensor member; and
   an input region configured to set a target temperature of the fluid stored in the internal space of the reservoir.

10. A method of verifying a passenger detection system, the method comprising:
    a dummy arrangement step of arranging a test dummy, which includes a dummy body and is defined by imitating a human, in a seat of a vehicle;
    a fluid circulation step of heating a fluid in the test dummy and circulating the fluid in the test dummy via a tube unit disposed in the test dummy; and
    an infrared ray detection step of detecting infrared rays radiated from the test dummy,
    wherein the dummy body comprises:
       a dummy body region defined by imitating a body shape of the human;
       a dummy head region connected to one side of the dummy body region and defined by imitating a head shape of the human;
       dummy arm regions connected to one side of the dummy body region and defined by imitating arm shapes of the human; and
       dummy leg regions connected to one side of the dummy body region and defined by imitating leg shapes of the human, and
    wherein in the fluid circulation step, the fluid passes through the dummy head region, the dummy arm regions, and the dummy leg regions, respectively, along the tube unit.

11. The method of claim 10, wherein the dummy arrangement step comprises arranging the test dummy in a rear seat of the vehicle.

12. The method of claim 10, wherein the test dummy has a shape that imitates the human.

* * * * *